(12) United States Patent
Hsu et al.

(10) Patent No.: US 10,296,609 B2
(45) Date of Patent: May 21, 2019

(54) EXTENDED MEMORY SYSTEM

(71) Applicant: Microsoft Corporation, Redmond, WA (US)

(72) Inventors: Bo-June Hsu, Woodinville, WA (US); Kuansan Wang, Bellevue, WA (US); Jeremy Espenshade, Seattle, WA (US); Chiyuan Huang, Bellevue, WA (US); Yu-ting Kuo, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 392 days.

(21) Appl. No.: 14/324,838

(22) Filed: Jul. 7, 2014

(65) Prior Publication Data

US 2016/0004732 A1 Jan. 7, 2016

(51) Int. Cl.
*G06F 17/00* (2006.01)
*G06F 17/30* (2006.01)

(52) U.S. Cl.
CPC .... *G06F 17/30312* (2013.01); *G06F 17/3087* (2013.01); *G06F 17/30389* (2013.01); *G06F 17/30424* (2013.01); *G06F 17/30884* (2013.01)

(58) Field of Classification Search
CPC .................................................. G06F 17/30312
See application file for complete search history.

(56) References Cited

U.S. PATENT DOCUMENTS

| | | | |
|---|---|---|---|
| 8,301,631 B2 | 10/2012 | Chow | |
| 8,386,457 B2 | 2/2013 | McCloskey et al. | |
| 2001/0039546 A1 | 11/2001 | Moore et al. | |
| 2008/0243631 A1 | 10/2008 | Kane et al. | |
| 2008/0319943 A1* | 12/2008 | Fischer | G06F 17/30867 |
| 2011/0225193 A1* | 9/2011 | Jennings | G06F 17/3087 707/776 |
| 2015/0370890 A1* | 12/2015 | Halan | G06F 17/30604 707/728 |

FOREIGN PATENT DOCUMENTS

| | | |
|---|---|---|
| WO | 0103403 A1 | 1/2001 |
| WO | 0217130 A2 | 2/2002 |
| WO | 2013147909 A1 | 10/2013 |

OTHER PUBLICATIONS

"International Search Report & Written Opinion Received for PCT Application No. PCT/US2015/038925", dated Oct. 27, 2015, 12 pages.

"Response to the International Search Report & Written Opinion Received for PCT Application No. PCT/US2015/038925", Filed Date: Feb. 10, 2016, 10 Pages.

(Continued)

*Primary Examiner* — Van H Oberly
(74) *Attorney, Agent, or Firm* — Medley, Behrens & Lewis, LLC

(57) ABSTRACT

Described herein are technologies that are configured to assist a user in recollection information about people, places, and things. Computer-readable data is captured, and contextual data that temporally corresponds to the computer-readable data is also captured. In a database, the computer-readable data is indexed by the contextual data. Thus, when a query is received that references the contextual data, the computer-readable data is retrieved.

20 Claims, 15 Drawing Sheets

(56) References Cited

OTHER PUBLICATIONS

"Written Opinion of the International Preliminary Examining Authority for PCT Application No. PCT/US2015/038925", dated Jun. 3, 2016, 8 Pages.
Aart, et al., "The NoTube BeanCounter: Aggregating User Data for Television Programme Recommendation" in Workshop on 8th International Semantic Web Conference of Social Data on the Web, Oct. 2, 2009, 12 pages.
Lee, et al., "A Probability-Based Unified Framework for Semantic Search and Recommendation Optimization", In Journal of Information Science, Oct. 2013, 1 page (Abstract Only).
Nasirifard, Peyman, "Context-Aware Access Control for Collaborative Working Environments Based on Semantic Social Networks", Aug. 20, 2007, 14 pages.
Porter, Rahsheen, "20+ Apps to Consolidate Your Life in the Cloud", Published on: Feb. 28, 2013 Retrieved at: <<http://android.appstorm.net/roundups/internet-roundups/20-apps-to-consolidate-your-life-in-the-cloud/>>, 16 pages.
Yu, et al., "Ontology-Based Semantic Recommendation for Context-Aware E-Learning", In Proceedings of the 4th Conference on Ubiquitous Intelligence and Computing, Jul. 11, 2007, 10 pages.
"International Preliminary Report on Patentability for PCT Application No. PCT/US2015/038925", dated Oct. 6, 2016, 14 Pages.
"Response to the Office Action for European Patent Application No. 15739425.5", Filed Date: Aug. 1, 2017, 13 Pages.

\* cited by examiner

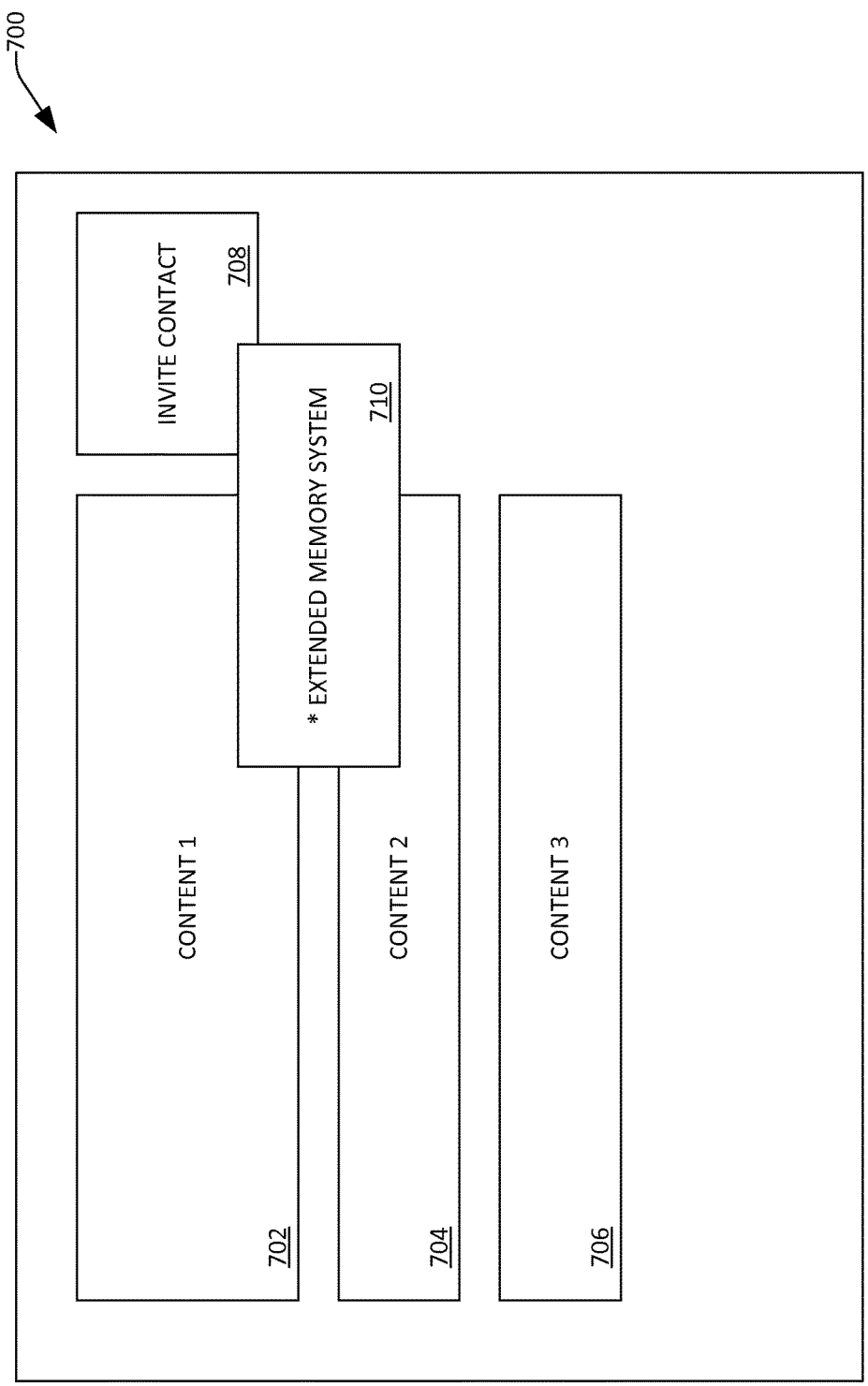

EXTENDED MEMORY SYSTEM

BACKGROUND

As computing devices have become ubiquitous, the amount of data generated by people has become massive, and is expected to grow nearly exponentially. Accordingly, it is often difficult for a user to remember where particular data is located (e.g., on what computing device, in what file, under what name), the time that the data was generated, etc. Conventionally, file systems have been used to assist users in organizing data, and the users rely on their memory and an organization schema (e.g., a naming convention) to locate data of interest. This approach is somewhat antiquated, as many applications employed by users generate data that is not well-suited for retention in manually generated folders. For instance, many users employ social networking applications, which place data in feeds that are constantly being updated. Thus, a "feed" or portion thereof is typically not well-suited for retention in a file folder. Furthermore, the amount of data in a feed may be incredibly large, thus rendering it tedious for the user to organize data in a manner that is different from what is supported natively by the social networking application. Still further, users tend to employ many different types of applications, each of which retains data differently. Thus, it may be difficult for a user to remember which application was used to generate data, what the generated data references, and so forth.

SUMMARY

The following is a brief summary of subject matter that is described in greater detail herein. This summary is not intended to be limiting as to the scope of the claims.

A computing system is disclosed herein. The computing system includes a processor and a memory, wherein the memory comprises an extended memory system that is executed by the processor. The extended memory system, when executed by the processor, is configured to receive computer-readable data from a first computer-executable application executing on a computing device. The extended memory system is further configured to receive contextual data that temporally corresponds to the computer-readable data from a second computer-executable application executing on the computing device. The extended memory system is also configured to expose the computer-readable data to a search component, the computer-readable data indexed by the contextual data.

BRIEF DESCRIPTION OF THE DRAWINGS

FIG. 7 illustrates an exemplary graphical user interface that facilitates inviting an extended memory system as a contact in a social networking application, wherein the extended memory system is configured to capture content generated by way of the social networking application as well as context corresponding to such content.

DETAILED DESCRIPTION

Figure 2:
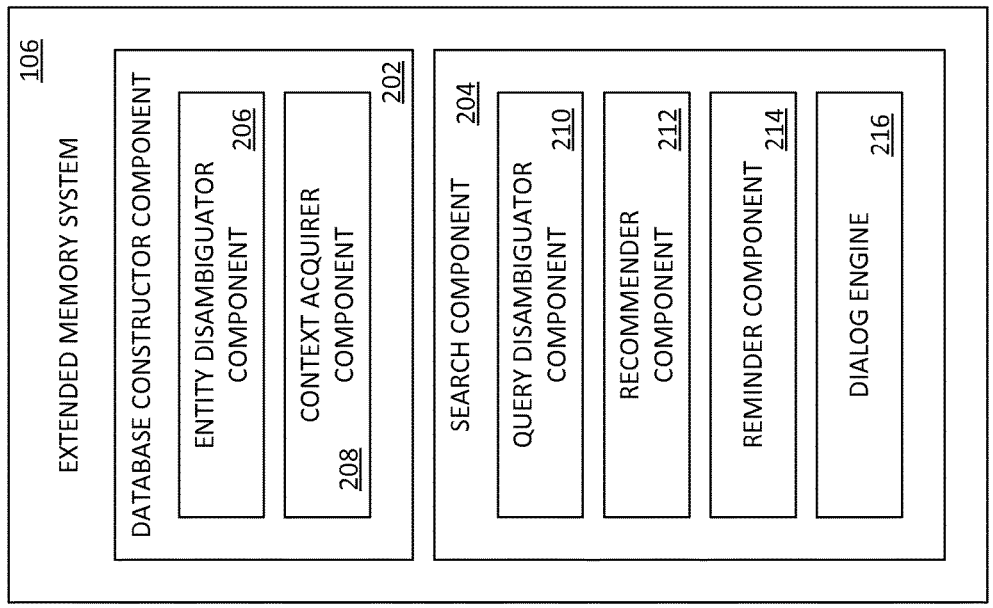
FIG. 2 is a functional block diagram of an exemplary extended memory system that is configured to construct a searchable database and search over the searchable database.

Various technologies pertaining to assisting users recollect information about people, places, and/or things are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Figure 1:
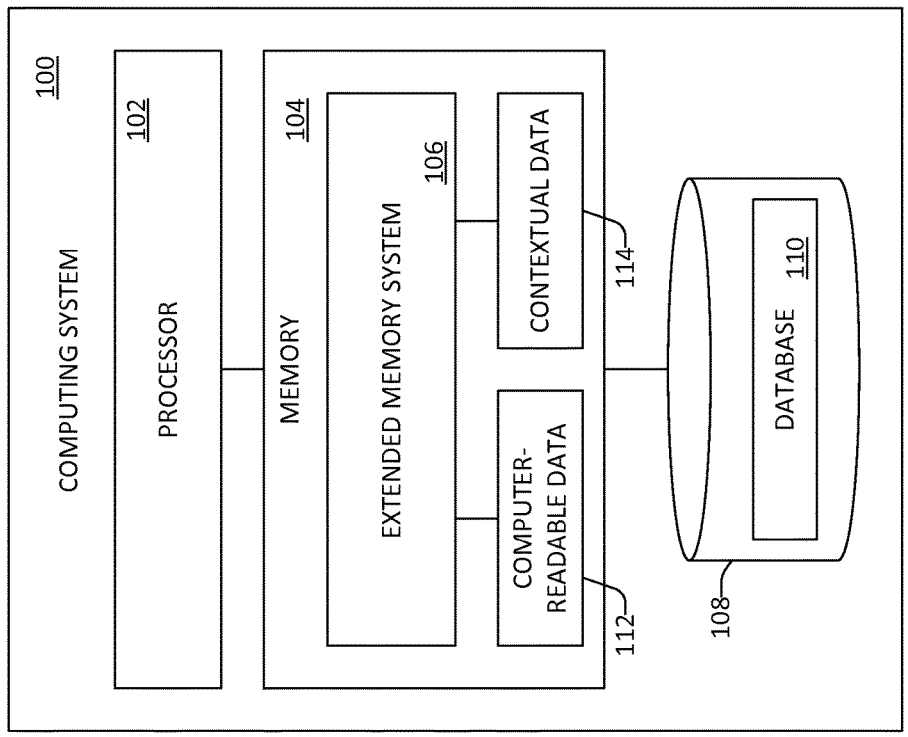
FIG. 1 is a functional block diagram of an exemplary computing system that is configured to assist a user with remembering information about a person, place, or thing.

With reference now to FIG. 1, an exemplary computing system 100 that is configured to assist users in recollecting information about people, places, and/or things is illustrated. The computing system 100 may be a single computing device or a distributed computing system. For example, the computing system 100 may be a rack-mounted server in a data center, several rack-mounted servers in the data center, a portion of an enterprise computing system, an entirety of the data center, or the like. The computing system 100 includes a processor 102 and a memory 104, wherein contents of the memory 104 are accessible to the processor 102. With more particularity, the memory 104 includes an extended memory system 106 that is executable by the processor 102. The computing system 100 additionally includes a data store 108 that includes a searchable database 110. As will be described in greater detail herein, the database 110 includes computer-readable data generated by applications employed by users, and further includes contextual data corresponding to such computer-readable data. For instance, the computer-readable data may be indexed in the database 110 by the contextual data.

Operation of the computing system 100 will now be generally described. As indicated previously, the computing system 100 is a client computing device employed by a user or is in communication with the client computing device. The client computing device can have applications that are executable thereon, wherein the applications are configured to generate computer-readable data based upon input from the user, where this input can be provided explicitly by the user or implicitly. For example, an application can monitor location of a user and log activities of the user—thus, the user need not explicitly provide such information. In another example, an operating system or application can track which applications are being used by the user and the associated contexts. Collection of such data, for instance, can be preconfigured. The applications may also be configured to generate computer-readable data for presentment to the user. At least some of the computer-readable data generated by the applications may desirably be obtained for subsequent user review, for issuing a reminder, for generating a recommendation, etc. Accordingly, computer-readable data 112 generated by an application on the client computing device can be received at the computing system 100 for storage and indexing.

In connection with receiving the computer-readable data 112, the user of the client computing device may optionally set forth an indication that the computer-readable data 112 is to be retained, thereby allowing for subsequent retrieval and/or analysis of the computer-readable data 112. Exemplary mechanisms for indicating that computer-readable data is to be retained are set forth below. Additionally, contextual data 114 that temporally (and optionally spatially) corresponds to the computer-readable data 112 can be received from the client computing device or from some other device (e.g., a device used to support a web service). For instance, current weather conditions can be received from a computing device that supports a web service that is configured to provide updated weather information. The contextual data 114 is descriptive of a context corresponding temporally to the computer-readable data 112. In an example, the computer-readable data 112 can be generated by a first computer-executable application and the contextual data 114 can be generated by a second computer-executable application.

In a non-limiting example, a user may be viewing a web page and may read a story that the user finds interesting; thus the user may wish to remember at least a portion of the story. The user can set forth an indication that the story on the web page is desirably remembered by the user (e.g., by tapping on a touch-sensitive display, through selection of a menu option that is presented upon right-clicking, etc.), which can cause the computer-readable data 112 to be provided to the computing system 100. In this example, the computer-readable data 112 can include the story itself, a link to the web page, a portion of the story, or the like. Additionally, at least one other application executing on the client computing device can capture contextual data that temporally corresponds to the user viewing the web page. For example, the contextual data may be identities of other applications that are being executed when the user is viewing the web page, an identity of a person with whom the user is meeting when the user is viewing the web page, an event occurring in the life of the user when the user is viewing the web page (e.g., the user is viewing the web page on her birthday), a weather event that is occurring when the user is viewing the web page (e.g., a thunderstorm, a blizzard, a temperature outside), a news event that occurs on the day that the user is viewing the web page, etc.

The extended memory system 106 receives the computer-readable data 112 and the contextual data 114 and indexes the computer-readable data 112 in the database 110 by the contextual data 114. In another example, the computer-readable data 112 can be indexed by the content of the computer-readable data. The extended memory system 106 can receive multiple instances of computer-readable data and respective corresponding contextual data over time, and can populate the database 110 with such computer-readable data and corresponding contextual data, where the computer-readable data is indexed by the contextual data.

When formatted in this manner, the database 110 supports retrieval of: 1) computer-readable data based upon contextual data corresponding thereto; 2) contextual data based upon computer-readable data corresponding thereto; and 3) retrieval of computer-readable data and/or contextual data based upon a combination of computer-readable data and contextual data. For example, the extended memory system 106 can retrieve appropriate computer-readable data in response to queries such as "what web page was I looking at during my meeting with John Doe", "who came to my birthday party last year", "what was I doing when the president was inaugurated", "what story was I reading when the song X was playing on my device", "find the page I was reading last week about Company A", amongst others.

As will be described in greater detail herein, a query to be executed over the database 110 can be received from a client computing device employed by a user, can be automatically constructed based upon contextual data (e.g., to generate recommendations or reminders), or can be a disambiguated query, wherein the user sets forth a query and the extended memory system 106 disambiguates the query. This may occur when a query references an ambiguous entity, and the extended memory system 106 can add metadata to the query or reformulate the query such that the entity is disambiguated. Due to the volume of contextual data that is retained, searches for computer-readable data can be completed more quickly when compared to conventional mechanisms for locating computer-readable data, which often include multiple searches, navigation through file folders, etc. For example, utilizing the extended memory system 106, a user can set forth the query "what document was I editing when meeting with Jane?", and the extended memory system 106 can execute a search using the contextual information about Jane, causing the document being searched for to be retrieved relatively quickly. In contrast, without the extended memory system 106, the user would be forced to attempt to recollect a word or phrase in the document, and search over documents contents (particularly if there are a large number of documents) may take a significant amount of time.

Now referring to FIG. 2, a functional block diagram of the extended memory system 106 is illustrated. The extended memory system 106 comprises a database constructor component 202 that is configured to build and populate the database 110. The extended memory system 106 also includes a search component 204 that is configured to execute searches over the database 110. The database constructor component 202 and the search component 204 will be discussed in turn.

The database constructor component 202 comprises an entity disambiguator component 206 that is configured to disambiguate entities referenced in the computer-readable data 112 that is to be indexed by the database constructor component 202. For example, computer-readable data 112 may include reference to an entity or entities that may be non-uniform or somewhat ambiguous. For instance, the computer-readable data 112 may include the acronym "US", which may refer to the United States, ultrasound, under study, user segment, amongst others. In another example, computer-readable data 112 to be indexed by the database constructor component 202 may include the word "bears" where, depending upon context, the term "bears" may refer to a professional United States football team, a collegiate mascot, stocks, animals, etc.

The entity disambiguator component 206 may utilize a variety of approaches to disambiguate entities referenced in received computer-readable data. In an example, the entity disambiguator component 206 can review historic observations about actions of the user to identify topics of interest to the user, and can disambiguate entities based upon identified topics of interest. For instance, if the user is known to be an avid sports fan (e.g., based upon previous computer-readable data indexed by the database constructor component 202), the entity disambiguator component 206 can infer that the term "bears" in computer-readable data likely refers to a professional football team. In another example, the entity disambiguator component 206 may include or have access to a dictionary (for the user) that maps words or word sequences to a disambiguated entity. Thus, the term "bears" may be included in the dictionary and mapped to "Chicago Bears".

In yet another example, the entity disambiguator component 206 can utilize natural language processing (NLP) techniques to identify a context in which an ambiguous term appears, and can disambiguate the term based upon such context. Therefore, for instance, the entity disambiguator component can disambiguate the term "bears" in the computer-readable data as referring to an animal when other portions of the computer-readable data refer to "carnivorous mammals". In situations where the computer-readable data represents a conversation, the entity disambiguator component 206 can disambiguate pronouns in the conversation. For instance, the computer-readable data may include the phrase "I like the shirt that you are wearing". In such phrase, when viewed in isolation, the pronoun "you" is ambiguous. The entity disambiguator component 206, however, may disambiguate such pronoun by receiving and analyzing other contextual data. For instance, the entity disambiguator component 206 can scrape a calendar of the user, and determine that the user is scheduled to meet with John Doe when the phrase was uttered. Thus, the entity disambiguator component 206 may disambiguate the pronoun "you" as referring to John Doe.

The entity disambiguator component 206 may further utilize voice recognition technology to determine identity of a speaker, which in turn can be used to disambiguate a pronoun in a conversation. In still yet another example, the entity disambiguator component 206 can utilize location to disambiguate an entity. For instance, a user may capture an image of a football stadium using a mobile telephone, and may tag the photo with the metadata "great day to watch a game". Here, the term "game" is ambiguous. The entity disambiguator component 206 can disambiguate the term "game" based upon time that the photo was captured and location where the photo was captured. For instance, using the location and time, the entity disambiguator component 206 can identify a game that is scheduled to occur at the location and time. The entity disambiguator component 206 may then assign metadata to the image that disambiguates the term "game".

Still further, the entity disambiguator component 206 may employ vision-based technologies to disambiguate an entity and/or object in computer-readable data that is to be indexed by the database constructor component 202. For example, the user may be participating in a video conference with a particular person, where the name of the person is never spoken in the conversation. The user may wish to recollect at least a portion of the conversation, such that the portion of the conversation is to be indexed in the database 110 by the database constructor component 202. The entity disambiguator component 206 can receive an image of a face of the person, and can use face recognition technologies to identify the person. The entity disambiguator component 206 can apply the identity of the person as metadata to the computer-readable data. Thus, if the user subsequently queries the database 110 using the identity of the person, the appropriate video conference can be identified and returned.

In summary, then, the entity disambiguator component 206 can receive computer-readable data that is to be included in the database 110. The entity disambiguator component 206 can disambiguate objects and/or entities referenced in the computer-readable data and can generate metadata for the computer-readable data based upon disambiguation of the objects and/or entities. The computer-readable data may then be indexed by the database constructor component 202 by the metadata. It can be ascertained that the entity disambiguator component 206 can be configured to generate this metadata in a uniform manner, such that, for instance, US, USA, US of A, and United States may all map to the disambiguated entity the United States of America.

The database constructor component 202 can also include a context acquirer component 208 that is configured to acquire contextual data about received computer-readable data. For example, responsive to the database constructor component 202 receiving computer-readable data, the context acquirer component 208 can ascertain contextual data corresponding thereto. If there is insufficient contextual data or if more contextual data is desired, the context acquirer component 208 can acquire contextual data about the received computer-readable data. For instance, the context acquirer component 208 can cause a signal to be transmitted to a client computing device that requests context corresponding to the client computing device. This context may be the location of the client computing device, identities of applications being executed on the client computing device, people in proximity to the client computing device, contextual data logged over time (e.g., over a specified time window), or the like. The database constructor component 202 can then index the computer-readable data by the contextual data. In the example where context is logged over time, a query over the database 110 using context results in filters being applied by time.

As indicated previously, the extended memory system 106 is configured to better lives of people by assisting them with recollecting information about people, places, things, or the like. That is, the extended memory system 106 is configured to improve lives of people through use of technology. To that end, the search component 204 is configured to expose the computer-readable data to search, wherein the database 110 can be searched based upon contextual data corresponding to computer-readable that may be remembered by the user, rather than content of the computer-readable data itself. Again, as noted above, the search component 204 can support searching over the database 110 based upon a query such as "what documents were discussed during a meeting I had with John Doe".

To facilitate searching over the database 110, the search component 204 can include a query disambiguator component 210 that can disambiguate entities and/or objects in a query received from a client computing device employed by the user. With more particularity, similarly to the computer-readable data described above, a query may include ambiguous keywords. The query disambiguator component 210 may utilize a variety of technologies to disambiguate entities and/or objects referenced in the query. For instance, the query disambiguator component 210 can receive previous queries issued by the user and disambiguate the received query based upon the previous queries (e.g., queries related to a particular topical interest in the past indicate that the user in will continue to be interested in the topic). In another example, the query disambiguator component 210 can receive identities of search results selected by the user, wherein the search results have categorical (contextual) data assigned thereto, for instance, by way of the Open Directory Project (ODP). This allows for the query disambiguator component 210 to determine categories or topics that may be of interest to the user, which can be used to disambiguate the query and/or terms therein. In another example, the query disambiguator component 210 can access the database 110 and identify categories assigned to entries in the database 110. In a non-limiting example, the query disambiguator component 210 can search the database 110 based upon an ambiguous object and/or entity in the query, and can identify at least one disambiguated version of the object and/or entity in the database 110. The query disambiguator component 210 can disambiguate the keyword or phrase in the query based upon frequently occurring disambiguations of the keyword or phrase.

In a non-limiting example, the query disambiguator component 210 can receive the query "who was I with when watching the bears". Based upon previous interests exhibited by the user (e.g., determined based upon explicit user input or determined through inference based upon observed previous actions of the user), the query disambiguator component 210 can determine that the user has an interest in nature, and thus, the term "bears" most likely refers to an animal, rather than a collegiate team. The query disambiguator component 210 may then add metadata to the query that indicates that the term "bears" refers to an animal, and the search component 204 can search the database 110 based upon the metadata. In another example, the search component 204 can perform a search that covers numerous (e.g., all) interpretations of an ambiguous query, and perform filtering of results on the back-end based upon explicitly provided or learned preferences. Referring to the example above, even when the user is interested in nature, but was not with anyone when watching bears (but did attend a collegiate sporting event with "Bears" as a mascot), a person with whom she attended the sporting even can be returned as a potential answer.

The search component 204 can also include a recommender component 212 that is configured to search the database 110 and output recommended computer-readable data to a user. In an example, the recommender component 212 can receive a context related to the user and can construct a query based upon the context. For instance, the recommender component 212 can receive an indication that the user has a meeting scheduled for a certain time, where the term "bears" is included in the subject line of the meeting. The recommender component 212, based upon this context, can construct a query that includes the keyword "bears", and the search component 204 can search the database 110 for computer-readable data pertaining to "bears". The recommender component 212 can utilize temporal information (context) to determine when to output a recommendation to the user (e.g., when to provide computer-readable data as a recommendation). For instance, if the meeting is at a particular time, the recommender component 212 can construct the aforementioned query and cause the query to be executed 15 minutes prior to the meeting. The recommender component 212 can then output computer-readable data (or links to the computer-readable data) located based upon the query as a recommendation. In this example, the user can enter the meeting fully prepared with computer-readable data that is pertinent to the meeting. Thus, the recommender component 212 can receive contextual data about the user (e.g., identities of applications the user is currently employing, location of the user, who the user is with, a schedule of the user, etc.), and can construct queries based upon the contextual data. The search component 204 can execute a search based upon the constructed queries over the database 110, and can output computer-readable data as recommendations to the user.

The search component 204 also includes a reminder component 214 that can execute searches over the database 110, wherein the queries are triggered based upon contextual data. The contextual data may be temporal, location-based, event-based, or the like. For instance, the user may wish to be reminded to stop at the grocery store after work when traveling close to a grocery store, and may register a reminder with the extended memory system 106. The reminder can be monitored by the reminder component 214, such that when the context set forth in the reminder is triggered, the reminder component 214 can execute a query over the database 110 and output corresponding computer-readable data (or links thereto) as a reminder to the user. In another example, the user may be provided with a computer-implemented advertisement that indicates that a retail store is having a sale on a product of interest to the user. The user may set forth an indication that is desirable that the sale be retained in the database 110 as something that the user wishes to remember. The user can add metadata to the advertisement, such as location of the retail store (or such location can be automatically determined by the context acquirer component 208). Additional contextual information may include when the sale is active, and a proximity to the store of the user. The reminder component 214 can monitor context of the user over time and can generate queries based upon context of the user. When context of the user matches the reminder registered with the extended memory system 106, the reminder component 214 can cause the search component 204 to execute a search over the database 110, to retrieve the computer-readable data, and present the computer-readable data to the user as a reminder. Again, the extended memory system 106 assists the user in recollecting something that the user was interested in recollecting.

In another example, the reminder component 214 can be used to help the user remind someone else of a task or event. In such a scenario, the user can identify a person or persons who are to be reminded—e.g., "remind John to pick up milk if he passes the grocery store." The user can further specify how John is to be reminded. For example, the user can select a particular application that John is known to use, wherein the extended memory system 106 can retain account information for John, including an identity of the application and a username for John. This reminder can be retained in the database 110, and the reminder component 214 can query the database using contextual information about John". For example, John can consent to allow the extended memory system 106 to acquire certain contextual information about John, including his location over time. The reminder component 214 can query the database 110 based upon contextual information about John, and can provide the reminder to John when the reminder is triggered.

In still yet another example, continuing reference to the exemplary scenario set forth above, when the user identifies John as the person to be reminded (e.g., by way of the extended memory system 106), John may be provided with a reminder request from John's extended memory system, which originated from the extended memory system 106 of the user. Thus, the extended memory system 106 of the user may communicate with other extended memory systems offered by the same service. Alternatively, John may be provided with an email, a text message, or other electronic message, which includes the reminder request. When John accepts the reminder request, an extended memory system may be set up for John (if not already existent). The reminder request can indicate that the user wishes to remind John about something (e.g., to pick up milk). When John accepts the request, the extended memory system for John can monitor context about John, and can trigger the reminder when appropriate. Upon completion of the task referenced above (John has picked up milk at the grocery store), the extended memory system for John can optionally inform the extended memory system 106 for the user that the task has been completed.

Further, the user can specify more granular information about when information is to be shared by way of the reminder component 214. For instance, referring to the example above, the user can indicate that John is to be reminded only if John is near the grocery store within a time window or time windows. For example, the user can specify that John is only to be reminded if passing the grocery store sometime within the next three days, between the hours of 5:00 pm and 6:00 pm, and only if traffic is not congested.

Still further, the reminder component 214 can help a user with sharing information with a certain person or persons. This sharing of information can be considered a reminder regarding who to share information with, when to share the information, and how to share the information. For instance, the user can capture an image using their mobile telephone, and can indicate that the image is to be shared with family members if the family members happen to travel to a location proximate to the location where the image was captured. Further, the user can indicate how this information is to be shared—e.g., by way of a social networking application, an SMS message, an email message, or the like. The family members of the user can optionally register with the extended memory system 106, such that contextual information about the family members can be tracked over time, and the reminder component 214 can use such contextual information to query the database 110. In another example, the user can identify account information about another user; e.g., a social networking account, an email account, a telephone number, or the like. The user may wish to share computer-readable data with the another user (e.g., an image, a blog post, etc.), and can instruct reminder component 214 to provide the information to the another user when contextual data specified by the user triggers sharing of the computer-readable data. For example, the user may wish to provide a coupon for suntan lotion to the another user, wherein such coupon is desirably surfaced to the another user (e.g., by way of an application specified by the user) when the temperature is above 70 degrees (Fahrenheit) at a certain location. The user may further specify an expiration date for the coupon. The reminder component 214 can cause the coupon to be provided to another user when this contextual information triggers the reminder (e.g., to share the coupon).

The search component 204 can also optionally include a dialog engine 216 that is configured to enable a continuous dialogue to be undertaken between the user and the extended memory system 106. For example, the user may initially set forth a query, and the search component 204 can receive the query and identify a plurality of results from the database 110 based upon the query. The dialog engine 216 can be configured to output at least a subset of the search results, as well as set forth suggestions to the user as to other items that may be of interest to the user. The user may then "search by browsing"—for instance, the user can select a suggestion, which can act as a filter over the retrieved search results or act as a new query.

For example, the user may set forth the query, "who was the opening band at the concert I went to with John Doe?" The search component 204 can execute a search over the database 110 based upon the query and can output computer-readable data based upon the query (e.g., for presentment to the user). The dialog engine 216 may also output suggestions to help the user browse through what may be of interest to the user. For example, the dialog engine 216 can allow the user to query by "John Doe" only, such that additional computer-readable data indexed by "John Doe" in the database 110 can be retrieved. In another example, the computer-readable data can indicate that the band "band" was the opening act at the concert that the user went to with John Doe. The dialog engine 216 can highlight "band" in the search results, and can also highlight other people who were at the concert with the user. The user may then select these other people, which can cause queries to be constructed based upon the people selected by the user. Thus, the dialog engine 216 facilitates exploration of content of the database 110 through browsing.

Figure 3:
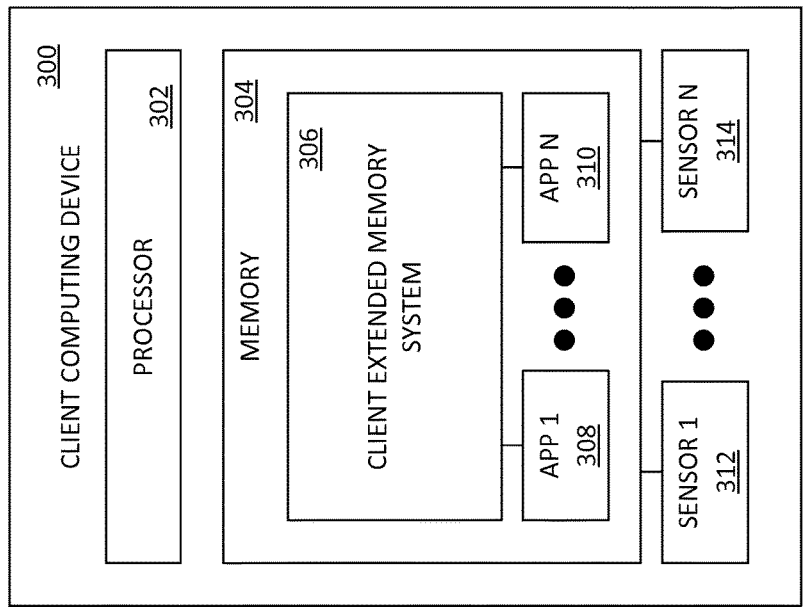
FIG. 3 is a functional block diagram of a client computing device that is configured to assist a user with remembering information about a person, place, or thing.

Now referring to FIG. 3, an exemplary client computing device 300 that is configured to capture: 1) computer-readable data; and 2) temporally corresponding contextual data is illustrated, wherein such data is captured for inclusion in the database 110. The computing device 300 may be a mobile computing device (such as a mobile telephone, a tablet computing device, a wearable computing device, etc.), a laptop computing device, a desktop computing device, etc. The client computing device 300 includes a processor 302 and a memory 304 that is accessible by the processor. The memory 304 includes a client extended memory system 306 that is configured to capture computer-readable data and corresponding contextual data for inclusion the database 110. The memory 304 also includes a plurality of computer-executable applications 308-310. The applications 308-310 can include word processing applications, web browsing applications, gaming applications, or any other suitable application that can be executed by a client computing device 300. The client computing device 300 also includes a plurality of sensors 312-314. The sensors 312-314 can include a microphone, a gyroscope, a speedometer, an accelerometer, a positioning sensor (e.g., a GPS sensor), a camera, a thermometer, a barometer, or the like.

As indicated previously, the client extended memory system 306 is configured to capture computer-readable data (e.g., generated by first application 308), is further configured to capture context temporally corresponding to the computer-readable data (e.g., where the context can be generated by the nth application 310). The client extended memory system 306 can capture data responsive to receipt of various user commands. For example, a user can set forth a voice command that causes the client extended memory system 306 to capture computer-readable data and corresponding contextual data. In another example, the client extended memory system 306 can capture computer-readable data and corresponding contextual data responsive to receipt of a gesture performed on a touch sensitive display of the client computing device 300. In yet another example, the client extended memory system 306 can be configured to capture computer-readable data and corresponding contextual data based upon a signal output by one or more the sensors 312-314. For instance, when a positional sensor indicates that the user has remained stationary for a relatively long period of time, and a voice sensor indicates that the user is having a conversation with another person, the client extended memory system 306 can infer that the user may wish to remember at least portions of the conversation and can cause computer-readable data to be captured (e.g., can cause a transcription of the conversation to be generated) and can further cause corresponding contextual data to be captured (e.g., time of the conversation, location where the conversation occurred, person with whom the user was having the conversation, ambient temperature when the conversation was occurring, world news events happening when the conversation was occurring, etc.).

Figure 4:
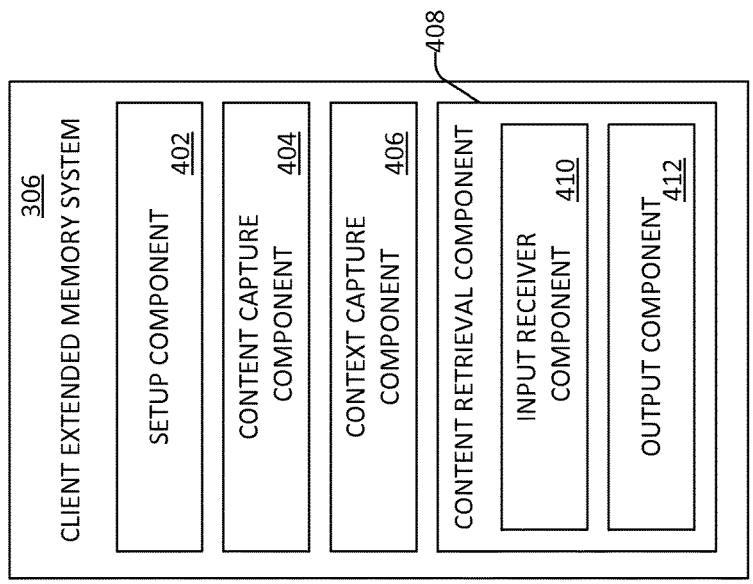
FIG. 4 is a functional block diagram of an exemplary client extended memory system that is configured to capture information for retention, and is further configured to facilitate retrieval of previously captured information.

With reference now to FIG. 4, a functional block diagram of the client extended memory system 306 is illustrated. The client extended memory system 306 includes a setup component 402 that is configured to facilitate setting up an account with the extended memory system 106 for the user of the client computing device 300. The setup component 402 can receive a user identifier, as well as information as to what type of information can be collected when the user employs the client computing device 300 or other computing device that is to be associated with the account (e.g., a device upon which the user can provide login credentials). For example, the user can identify applications from which computer-readable data can be collected, and can identify applications from which computer-readable data is not to be collected. Furthermore, by way of the setup component 402, the user can set forth restrictions as to times that computer-readable data can be collected, locations were computer-readable data can and cannot be collected, computing devices from which data can and cannot be collected, etc.

The client extended memory system 306 can also include a client capture component 404 that is configured to capture computer-readable data responsive to the user of the client computing device 300 setting forth a command and/or responsive to a particular context being observed. Exemplary commands that can be recognized by the content capture component 404 that cause the content capture component 404 to capture computer-readable data include a gesture on a touch-sensitive display (e.g., a tap on a touch sensitive display), a voice command, a gesture in space that can be recognize by analyzing video of the user, selection of a menu item, selection of a graphical button, etc. In another example, the content capture component 404 can be configured to capture computer-readable data responsive to a predefined context being recognized. For instance, in an example, the content capture component 404 can be configured to capture particular computer-readable data each time the user is at a particular location. As described previously, computer-readable data captured by the content capture component 404 can be transmitted by the client extended memory system 306 to the computing system 100, where the extended memory system 106 can store or reference the computer-readable data in the database 110.

The client extended memory system 306 also includes a context capture component 406 that is configured to capture contextual data that temporally corresponds to the computer-readable data. Exemplary contextual data that can be captured by the context capture component 406 may include, but is not limited to, identity of an application from which the computer-readable data is captured, other applications executing at the time that the computer-readable data was captured, an identity of a person with whom the user of the client computing device 300 is known to be with when the computer-readable data is captured, time of day that the computer-readable data is captured, weather conditions when the computer-readable data was captured, season (e.g., spring, summer, fall, or winter) when the computer-readable data was captured, prominent news events when the computer-readable data was captured, events in life specific to the user when the computer-readable data was captured (e.g. birthday of the user, family members of the user, friends of the user, an anniversary, etc.), and so forth.

With respect to identifying a person or people in proximity to the user when the computer-readable data is captured by the content capture component 404, the context capture component 406 can identify the person or people in a variety of manners. In a first example, the context capture component 406 can scrape a calendar application of the user of the client computing device 300 and, for a time corresponding to when the computer-readable data is captured, identify people referenced in the calendar application. In another example, hardware of the client computing device 300 can be leveraged to identify people with whom the user of the client computing device 300 is interacting when the computer-readable data is captured. For instance, the sensors 312-314 of the client computing device 300 may include a camera that captures images of the surroundings of the client computing device 300. Image analysis software can be configured to search the image for faces, and facial recognition technologies can be used to identify a person captured in an image. In another example, the sensors 312-314 can include a microphone, and the client computing device 300 may leverage voice recognition technologies that can identify a person based upon her voice. In still yet another example, the sensors 312-314 may include a proximity sensor that can detect when the client computing device 300 is in proximity to another client computing device of another user (e.g., through a handshake protocol). In such an example, the client computing devices can transmit data therebetween that is indicative of identities of users of the devices. Moreover, the user of the client computing device 300 may explicitly identify the person by way of a voice command, by way of entry of an identity of the person through a keyboard, etc. Responsive to the content capture component 404 capturing the computer-readable data and the context capture component 406 capturing contextual data about the computer-readable data, the extended memory system 306 can be configured to transmit such data to the computing system 100.

The client extended memory system 306 further includes a content retrieval component 408 that is configured to facilitate retrieval of data from the database 110 of the computing system 100. The content retrieval component 408 can include an input receiver component 410 that receives input relevant to data in the database 110. In an example, the input receiver component 410 can receive a query explicitly set forth by the user, wherein the query, for example, may include a reference to the contextual data that is used to index the computer-readable data in the database 110. The extended memory system 106 can retrieve relevant computer-readable data based upon the query, wherein conventionally queries that reference contextual data are not readily supported. The query received by the input receiver component 410 may be a voice query set forth by a user, a query set forth by way of a keyboard, or other similar mechanism for inputting a query. In another example, the input receiver component 410 can receive contextual data output by one or more of the applications 308-310 installed on the client computing device 300 or from one or more of the sensors 312-314 on the client computing device 300. The input receiver component 410, responsive to receipt of such contextual data, can construct a query based upon the contextual data and transmit the query to the extended memory system 106 of the computing system 100.

The content retrieval component 408 also includes an output component 412 that receives data identified by the extended memory system 106 as being relevant to the query, where the query was transmitted to the extended memory system 106 by the input receiver component 410. For example, the output component 412 can output search results to a display of the client computing device 300, where the search results include computer-readable data in the database 110, identifiers for computer-readable data in the database 110, links to computer-readable data in the database 110, etc. The output component 412 may also generate audio output pertaining to search results. For example, when the search result includes a computer-readable data that represents a captured conversation, the output component 412 can replay the relevant portion of the conversation. Likewise, the output component 412 can present a video, an image, or the like.

In an example, the client extended memory system 306 can be included as a portion of the operating system for the client computing device 300. That is, the client extended memory system 306 can be built into the operating system of the client computing device 300 and, therefore, can have access to output of the applications 308-310 installed on the client computing device 300 and/or the sensors 312-314 on the client computing device 300. In another example, the client extended memory system 306 may be a standalone application installed on the client computing device 300, and one or more of the application 308-310 can be configured to transmit data to such application. Furthermore, while the client extended memory system 306 and the extended memory system 106 had been referenced as being included in separate computing systems, it is to be understood that the client extended memory system 306 and the extended memory system 106 may reside in a same computing system. For example, the client computing device 300 may be configured with the extended memory system 106. Moreover, the client extended memory system 306 may be configured with functionality described as being performed by the extended memory system 106. For instance, the client extended memory system 306 may be configured with disambiguation functionality, such as that described above with respect to the entity disambiguator component 206 and the query disambiguator component 210. In yet another example, the client extended memory system 306 can be included as a portion of a network-accessible service, such as one that acts to forward messages to an agent email address, invite an agent to a chat, etc.

Figure 5:
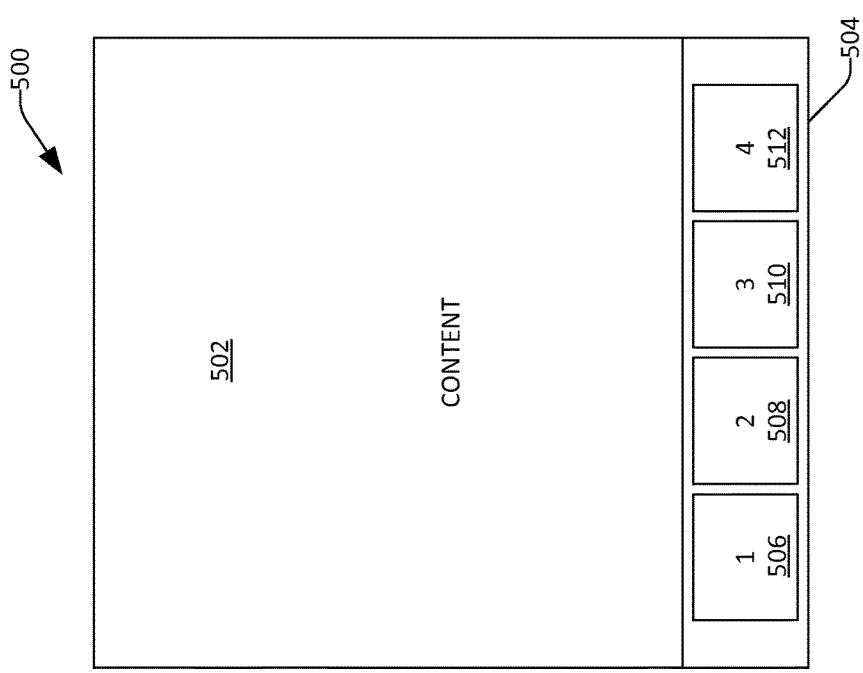
FIG. 5 illustrates an exemplary graphical user interface that can be presented on a display of the client computing device that may assist a user in remembering information about a person, place, or thing.

Now referring to FIG. 5, an exemplary graphical user interface 500 that facilitates capturing computer-readable data for transmittal to the extended memory system 106 is illustrated. Thus, the graphical user interface 500 can be presented on a display of the client computing device 300. The graphical user interface 500 includes a content portion 502 that depicts content. The content may be text, images, a video, etc. The graphical user interface 500 also includes a field 504 that includes several selectable buttons 506-512. In an example, the field 504 can be invoked responsive to the user setting forth a command on the client computing device 300. In a non-limiting example, the field 504 can be invoked by way of a gesture set forth by the user of the client computing device 300, such as a swipe from the bottom of a display upwards, a swipe from a side of the display inwards, etc. In another example, the field 504 can be invoked responsive to receipt of a voice command from the user of the client computing device 300. At least one of the buttons 506-512 in the field 504, when selected, can cause at least a portion of the content shown in the content field 502 to be captured, and can further cause contextual data corresponding thereto to be captured (as described above). The content and corresponding contextual data can then be transmitted to the computing system 100, where the extended memory system 106 may then index the computer-readable data in the content field 502 in the database 110 by the contextual data.

Figure 6:
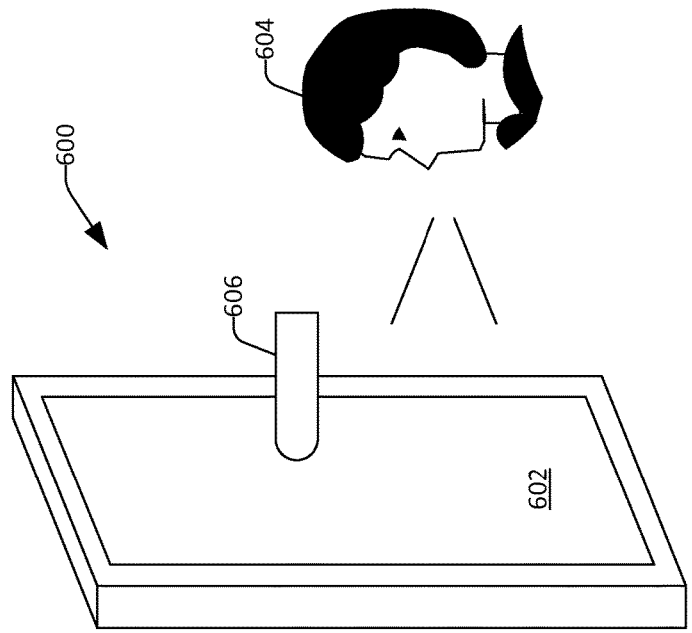
FIG. 6 illustrates exemplary user interactions with a client computing device that causes the client computing device to capture information and contextual data associated therewith.

Now referring to FIG. 6, an exemplary mobile computing device 600 is illustrated. The mobile computing device 600 may be a mobile telephone, a tablet computing device, a wearable computing device (such as a watch), or the like.

The mobile computing device 600 includes a touch sensitive display 602. The touch sensitive display 602 may present content thereon. A user 604 may perform a gesture relative to the touch sensitive display 602 to cause the content shown thereon to be captured and transmitted to the extended memory system 106 together with corresponding contextual data. In an example, the user 604 may "tap" the touch sensitive display 602 with a member 606, such as a finger, a stylus, or the like. The content capture component 404 of the client extended memory system 306 in the mobile computing device 600 can detect the "tap" and can cause content shown on the touch sensitive display 602 to be captured and transmitted to the computing system 100. Additionally, the client computing device 600, responsive to the content capture component 404 detecting the "tap", can cause contextual data to be captured and transmitted to the computing system 100. As indicated previously, in addition to or alternatively to capturing content and contextual data responsive to user interaction with respect to the touch sensitive display 602, the mobile computing device 600 can be configured to capture content shown on the touch sensitive display 602, as well as corresponding contextual data responsive to identifying some other input, such as a spoken utterance set forth by the user 604, a gesture made by the user 604 (e.g., a wink or series of winks), etc.

Now referring to FIG. 7, an exemplary graphical user interface 700 of a social networking application is shown. The graphical user interface 700 includes a feed that can be presented to the user, where the feed includes first content 702, second content 704, and third content 706. The content 702-706 may be posts made by contacts of the user, posts made by the user, posts made by someone who the user is following, and so forth. The user may wish that the extended memory system 106 be configured to obtain computer-readable data in the social networking application, and index the computer-readable data by contextual data corresponding thereto. Accordingly, for instance, the graphical user interface 700 may include a button 708 that can be selected to invite a contact to be a "friend" on the social networking application. In the example shown in FIG. 7, the user may choose to invite a representation of the extended memory system 106 (shown in window 710). Accordingly, the user has authorized the extended memory system 106 to monitor information presented in the social networking application to which the user has access. The user may set forth more granular information as to what is to be captured by the extended memory system 106, such as identities of contacts of the user whom the extended memory system 106 is to follow (e.g., such that posts generated by the identified contacts can be captured and indexed), types of content the user wishes for the extended memory system 106 to capture (e.g., images and videos, but not text), and so forth.

Figure 8:
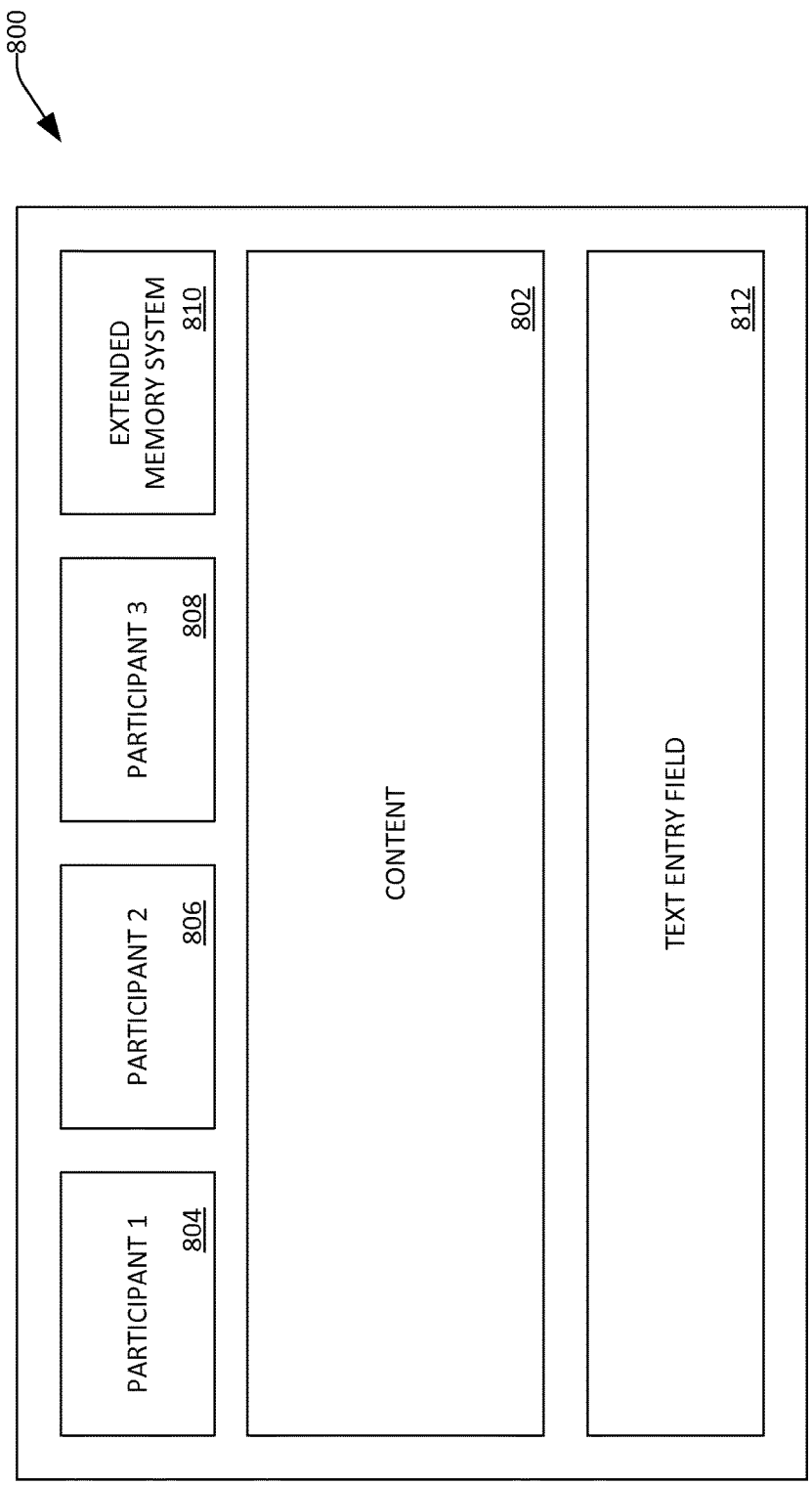
FIG. 8 illustrates an exemplary graphical user interface of a unified communications (UC) application, where an extended memory system has been invited to a meeting conducted by way of the UC application.

Now referring to FIG. 8, another exemplary graphical user interface 800 that can be presented on a display of the client computing device 300 is illustrated. The graphical user interface 800 may be for an instant messaging application, a unified communications (UC) application, a videoconferencing application, etc. In the exemplary graphical user interface 800, a content field 802 may include content presented in a meeting by one or more participants of the meeting. A plurality of graphical objects 804-810 respectively represent participants in the meeting. The graphical user interface 800 may further include a text entry field 812, wherein the user can set forth textual information to meeting participants by way of the text entry field 812. In this example, the user may request assistance in remembering contents of the meeting. Accordingly, the user can invite a representation of the extended memory system, as shown by the graphical object 810. Thus, other participants will be notified that the meeting is being monitored, and content set forth during the meeting is being provided to the extended memory system 106. Audio of the meeting can be captured by the client extended memory system 306. In this example, the client extended memory system 306 can be included in a data center that hosts the application; since the audio is shared with the agent that executes in the data center, the client computing device need not have to record the meeting locally. The client extended memory system 306 can provide the audio to the extended memory system 106, may generate a transcription of the audio and provide the transcription to the extended memory system 106, can capture content in the content field 802 and transmit such content to the extended memory system 106, etc., can capture identities of the meeting participants and transmit such identities to the extended memory system 106, etc. Further, the client extended memory system 306 can capture contextual data about the meeting and transmit such contextual data to the extended memory system 106, which can index portions of the meeting by the contextual data.

Figure 9:
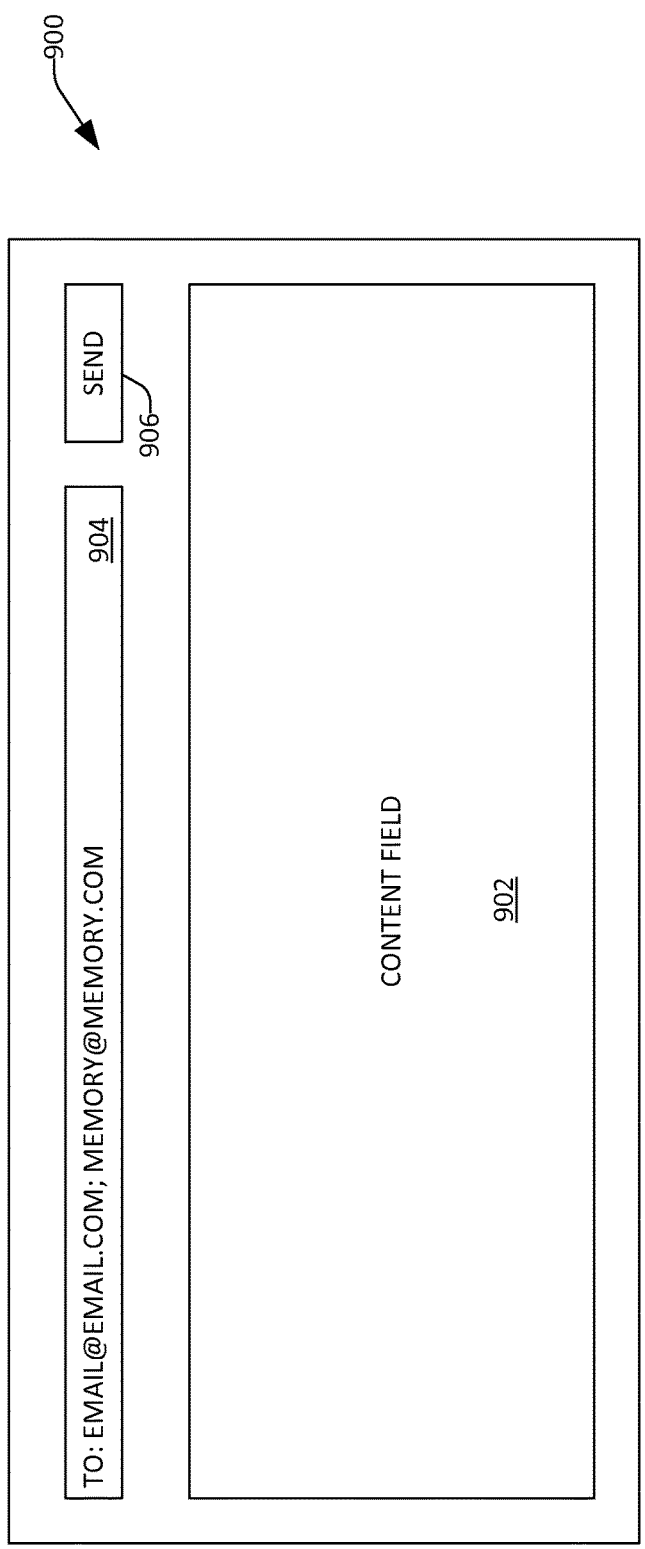
FIG. 9 illustrates an exemplary graphical user interface of an e-mail application, wherein the e-mail is transmitted to an extended memory system for retention and indexing.

With reference now to FIG. 9, an exemplary graphical user interface 900 of an e-mail application is illustrated. The graphical user interface 900 includes a content field 902, where the user can review content or enter a message that is to be transmitted by way of an e-mail application. The graphical user interface 900 also includes a "To" field 904, where the user can enter e-mail addresses of intended recipients of the e-mail. In the example shown in FIG. 9, the user wishes to send the e-mail to the e-mail address "e-mail@e-mail.com." The user can also indicate that she wishes for the extended memory system 106 to index content of the e-mail by entering an e-mail address for the extended memory system 106 in the "To" field. For example, the e-mail address "memory@memory.com" may be an e-mail address assigned to the extended memory system 106, such that the extended memory system 106 knows that the user wishes for the e-mail to be captured and indexed in the database 110. The user can also configured the extended memory system 106 to index emails as well as other sources of data described herein. The graphical user interface 900 includes a "Send" button 906, wherein upon the user selection of the "Send" button 906, the e-mail is transmitted to the intended recipients.

Figure 10:
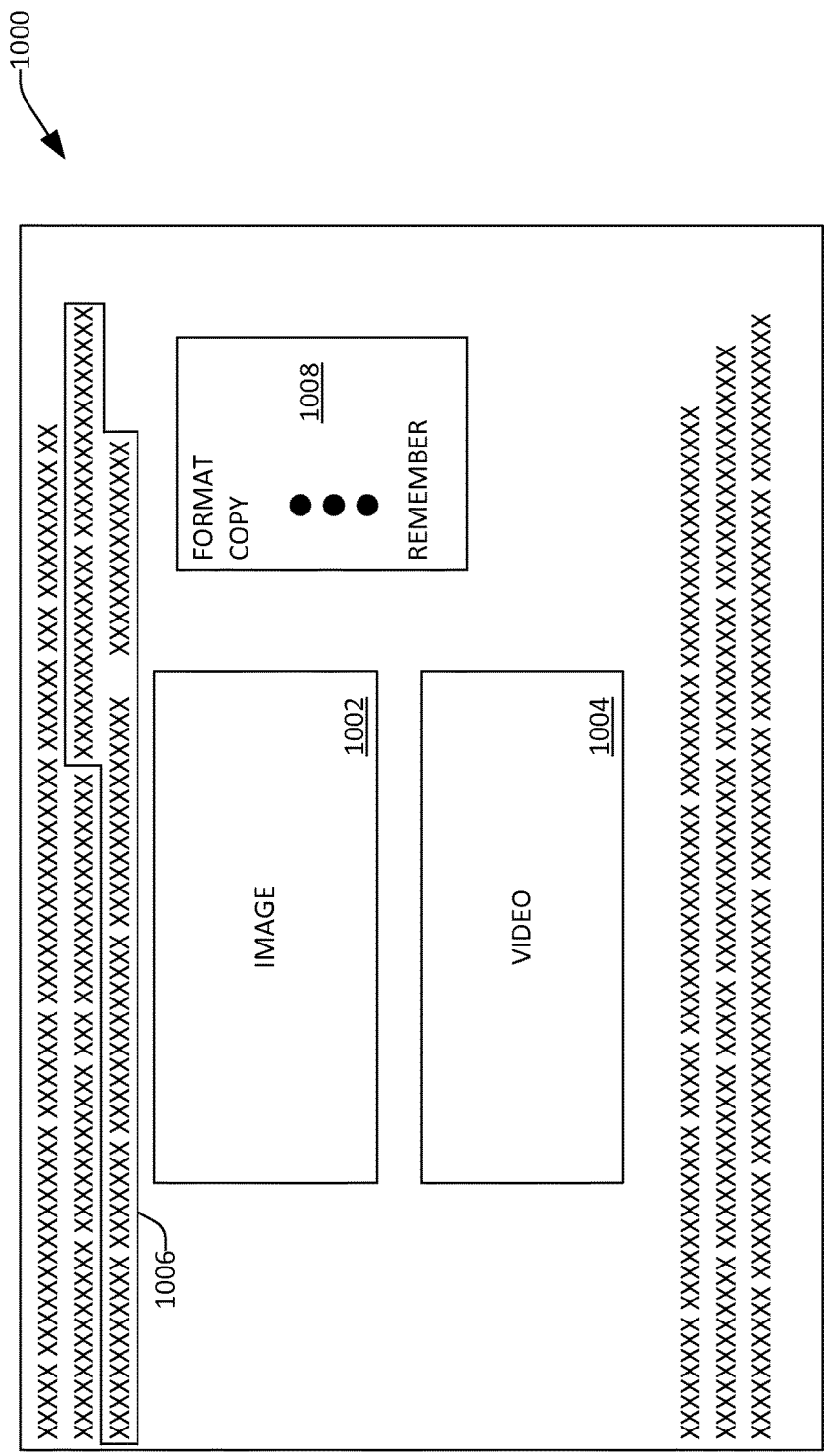
FIG. 10 illustrates an exemplary graphical user interface of a content page, where content displayed on the content page is selected and caused to be stored and indexed in a database.

With reference now to FIG. 10, another exemplary graphical user interface 1000 that facilitates capture of computer-readable data and indexing of the computer-readable data by corresponding contextual data is illustrated. The graphical user interface 1000 includes text, an image 1002, and a video 1004. In the example shown in FIG. 10, a user can select a portion 1006 of the text and can set forth some command that causes a window 1008 to be presented. The command may be a voice command, a right-click on a mouse, or the like. The window 1008 includes a plurality of selectable options that are representative of operations that can be performed with respect to the selected text. These operations can include, for example, copy, paste, send, format, etc. The operations can also include a "remember" option, which when selected, causes the highlighted text (or other content selected by the user) to be provided to the extended memory system 106. Selection of the "remember" option can also cause contextual data corresponding to the selected text to be captured and transmitted to the extended memory system 106, where it can be used to index the highlighted portion 1006.

Figure 11:
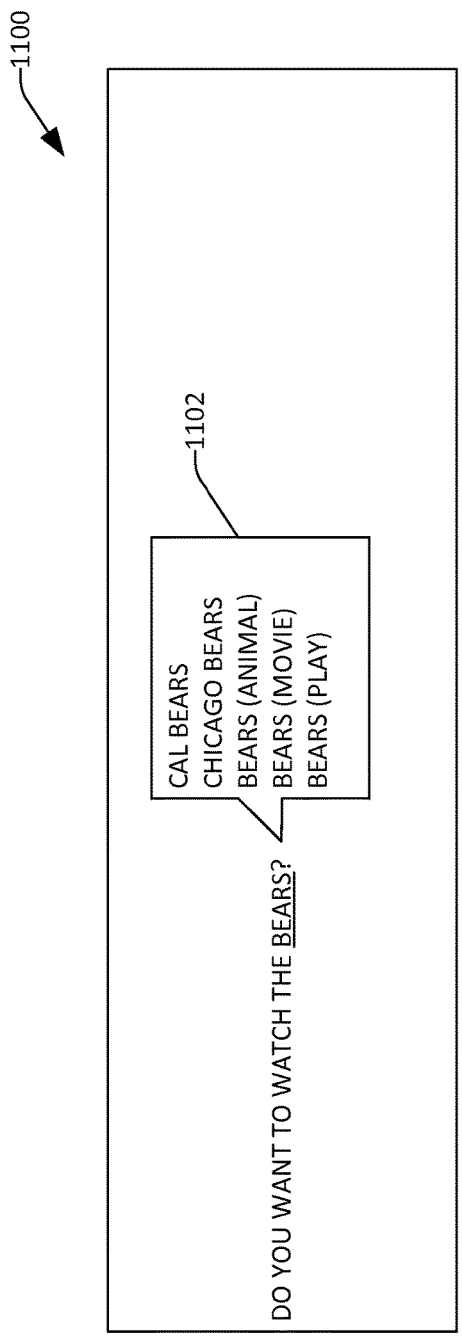
FIG. 11 illustrates an exemplary graphical user interface that facilitates disambiguating an entity during content creation.

Turning now to FIG. 11, an exemplary graphical user interface 1100 that may be included in a text editor is illustrated. The text editor may be in a word processing application, in a browser, or the like. In the example shown in FIG. 11, the user sets forth the text "do you want to watch the bears?" It can be ascertained, as noted above, that the term "bears" as set forth in the text is somewhat ambiguous. To facilitate disambiguating the term "bears", a window 1102 can be presented that depicts metadata that can be assigned to the text shown in the graphical user interface to disambiguate the term "bears". For example, if the user intended to refer to the Chicago Bears, the user can select the Chicago Bears option in the window 1102, which causes the metadata "Chicago Bears" to be assigned to the text. This metadata may then be provided to the extended memory system 106, which can index the text by the entity "Chicago Bears". Therefore, subsequently, if the user wishes to recollect something about the Chicago Bears and sets forth a query about the Chicago Bears, the extended memory system 106 can provide relevant data back to the user (e.g., the message shown in the graphical user interface 1100).

FIGS. 12-17 illustrate exemplary methodologies relating to assisting a user with recollecting information about people, places, or things. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 12:
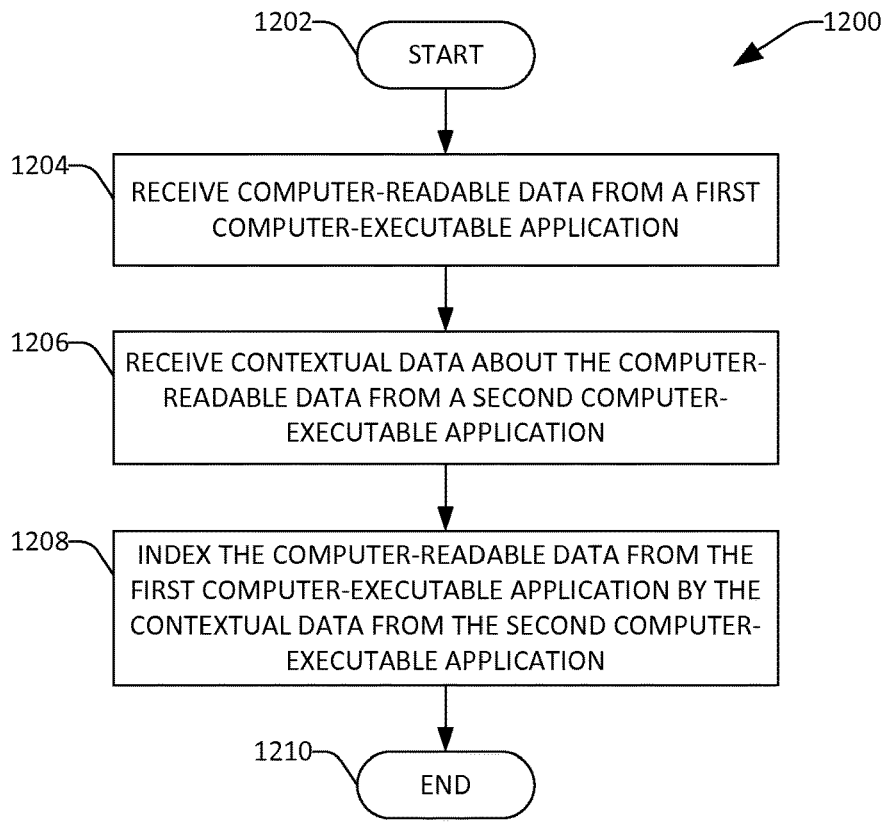
FIG. 12 is a flow diagram that illustrates an exemplary methodology for indexing computer-readable data in a database by contextual data corresponding to the computer-readable data.

With reference now to FIG. 12, an exemplary methodology 1200 that facilitates indexing computer-readable data by temporally corresponding contextual data is illustrated. The methodology 1200 starts at 1202, and at 1204, computer-readable data is received from a first computer-executable application. For instance, the first computer-executable application may be a web browser, a social networking application, a word processing application, an image viewing application, a video playing application, or other suitable application. At 1206, contextual data about computer-readable data is received from a second computer-executable application. In an example, the second computer-executable application may be a voice recognition application, and the contextual data may be an identity of the speaker. In another example, the second computer-executable application may be an operating system, and the contextual data can be data acquired from a sensor. At 1208, the computer-readable data received at 1204 is indexed by the contextual data received at 1206. Accordingly, a user can subsequently query a database based upon the contextual data, resulting in retrieval of the computer-readable data. The methodology 1200 completes at 1210.

Figure 13:
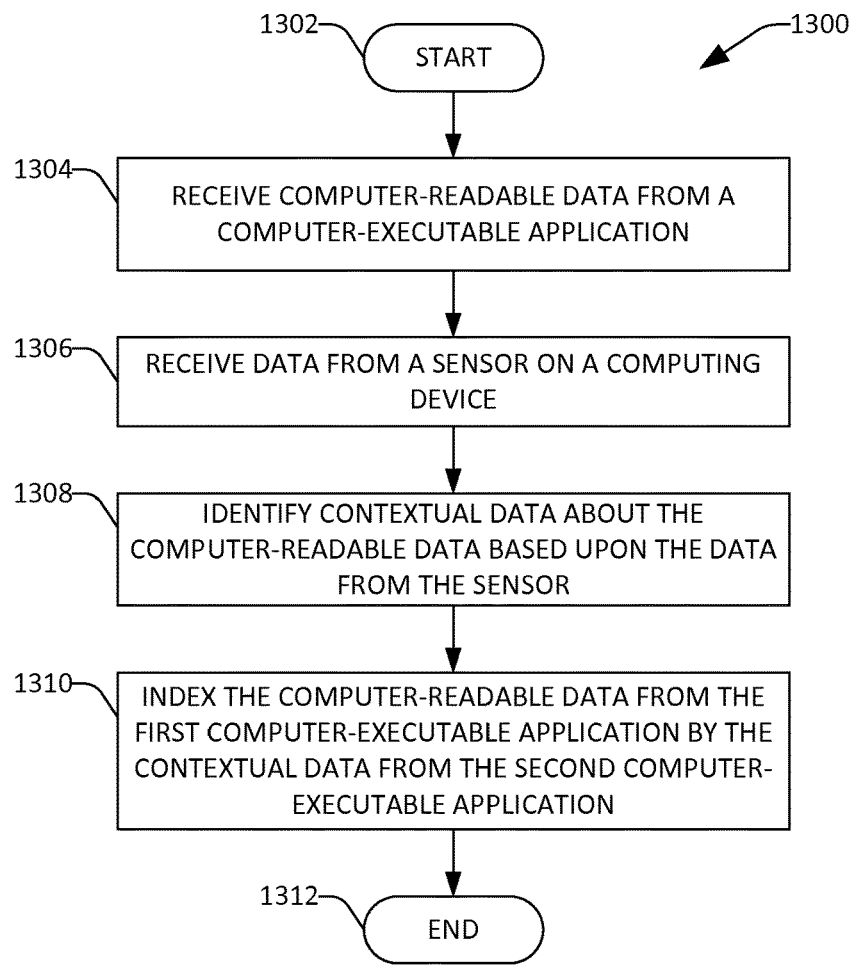
FIG. 13 is a flow diagram that illustrates an exemplary methodology for indexing computer-readable data by contextual data corresponding thereto.

Now referring to FIG. 13, an exemplary methodology 1300 for constructing a searchable database is illustrated. The methodology 1300 starts at 1302, and at 1304, computer-readable data is received from a computer-executable application. At 1306, data from a sensor on a computing device is received. The sensor may be a position sensor, a camera, a barometer, a temperature sensor, or the like. At 1308, contextual data about the computer-readable data is identified based upon the data from the sensor. For instance, the data from the sensor may be an image of a person, and the contextual data about the computer-readable data may be an identity of the person. In another example, the contextual data may be the data output by the sensor itself—thus, the contextual data may be the temperature output by the thermometer. At 1310, the computer-readable data received at 1304 is indexed by the contextual data identified at 1308 in a searchable database. The methodology 1300 completes at 1312.

Figure 14:
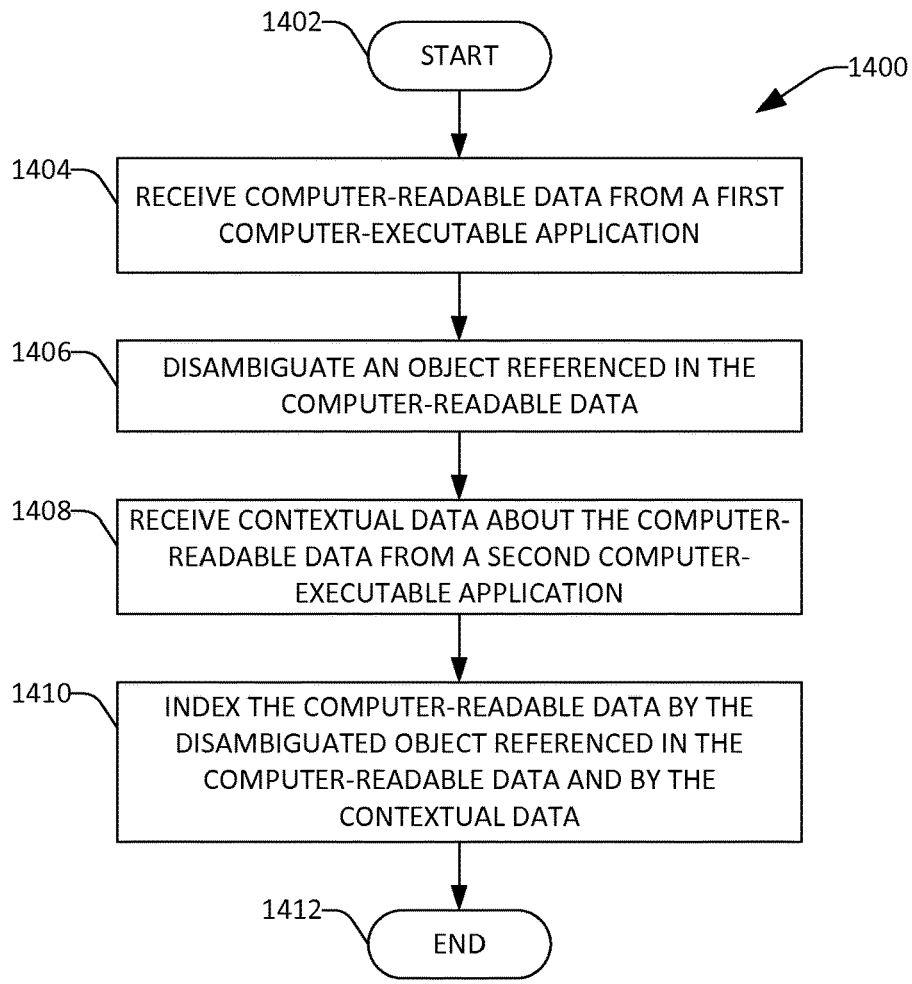
FIG. 14 is a flow diagram that illustrates an exemplary methodology for disambiguating an object or entity referenced in computer-readable data and indexing the computer-readable data by the disambiguated object or entity.

Now referring to FIG. 14, an exemplary methodology 1400 that facilitates indexing computer-readable data by a disambiguated entity in a searchable database is illustrated. The methodology 1400 starts at 1402, and at 1404 computer-readable data is received from a first computer-executable application. At 1406, an object referenced in the computer-readable data is disambiguated. For example, the entity disambiguator component 206 may disambiguate the object. At 1408, contextual data about the computer-readable data is received from a second computer-executable application. At 1410, the computer-readable data received at 1404 is indexed by the disambiguated object referenced in the computer-readable data, and also by the contextual data received at 1408. The methodology 1400 completes at 1412.

Figure 15:
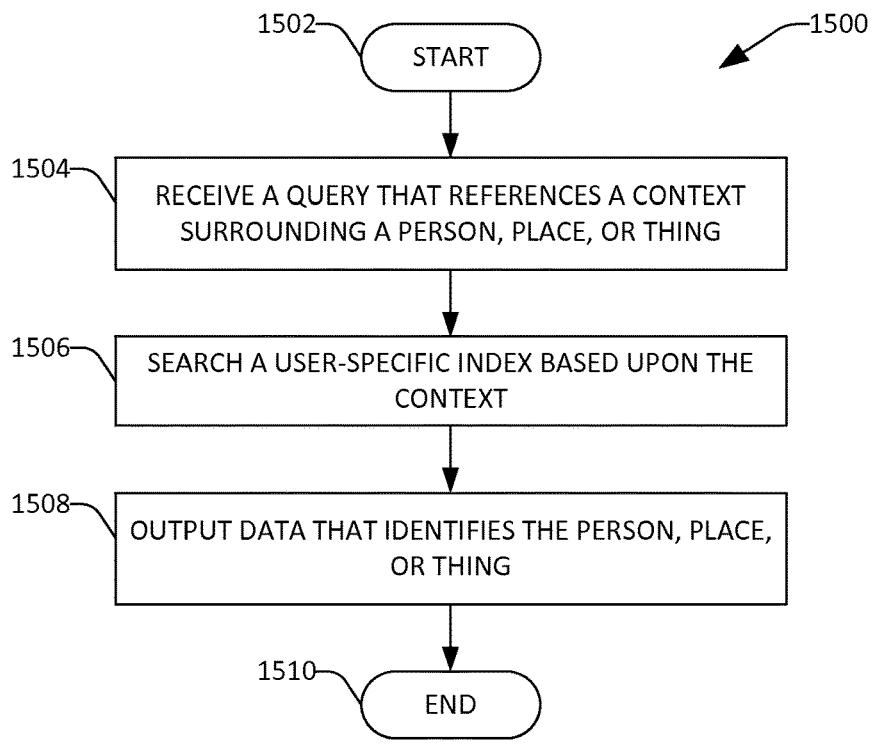
FIG. 15 is a flow diagram that illustrates an exemplary methodology for performing a search over a database, wherein a query employed to perform the search comprises a reference to contextual data.

Now turning to FIG. 15, an exemplary methodology 1500 that facilitates querying a database generated by the extended memory system 106 is illustrated. The methodology 1500 starts at 1502, and at 1504, a query is received that references a context surrounding a person, place, or thing. The context may be a person, a time, a location, etc. At 1506, a user-specific index is searched based upon the contents referenced in the query. The term "user specific" indicates that the index is personalized for the user and is configured to assist the user in recollecting information people, places, and things that are of interest to the user. At 1508, data is output that identifies the person, place, or thing that had the context corresponding thereto. The methodology 1500 completes at 1510.

Figure 16:
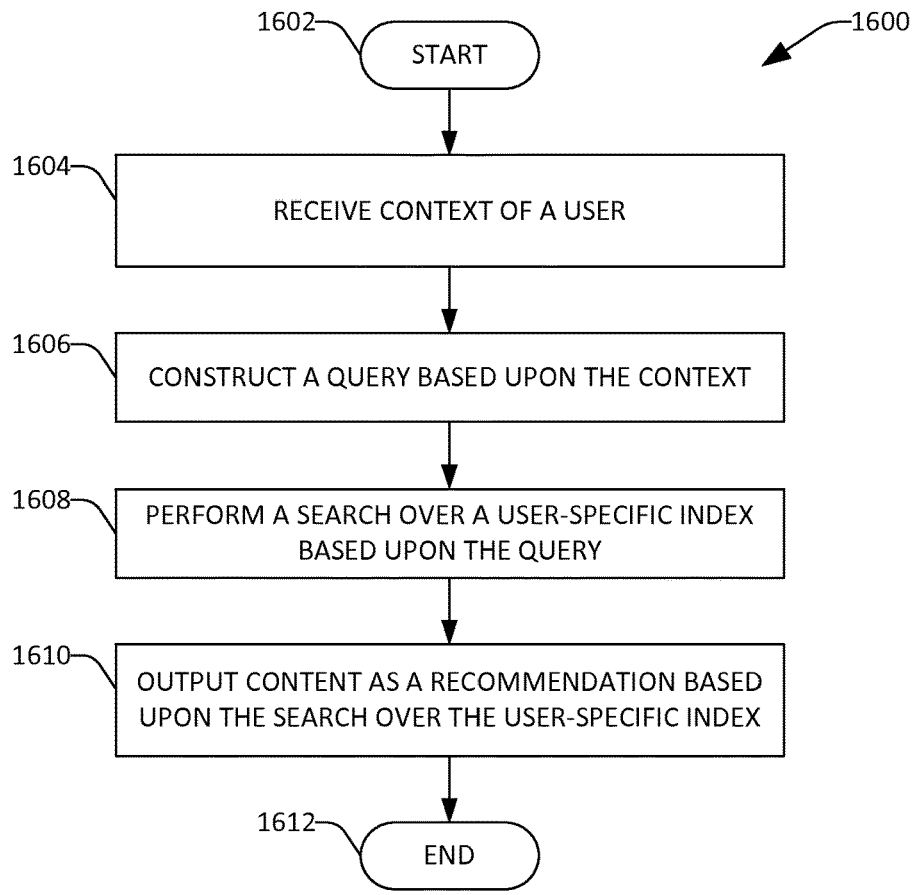
FIG. 16 is a flow diagram that illustrates an exemplary methodology for automatically constructing a query to execute over a database based upon an identified context of a user.

Now turning to FIG. 16, an exemplary methodology 1600 that facilitates outputting a recommendation is illustrated. The methodology 1600 starts at 1602, and at 1604 context of a user is received. This context may be location of the user, something being reviewed by the user, a meeting to be attended by the user, or the like. At 1606, a query is constructed based upon the received context. As described previously, the query may be constructed automatically and may include a reference to the context received at 1604. At 1608, a search over a user-specific index is performed based upon the query constructed at 1606. The search may result in identification of computer-readable data that may be relevant to the current context of the user. At 1610, content is output as a recommendation based upon the search over the user specific index. The methodology 1600 completes the 1612.

Figure 17:
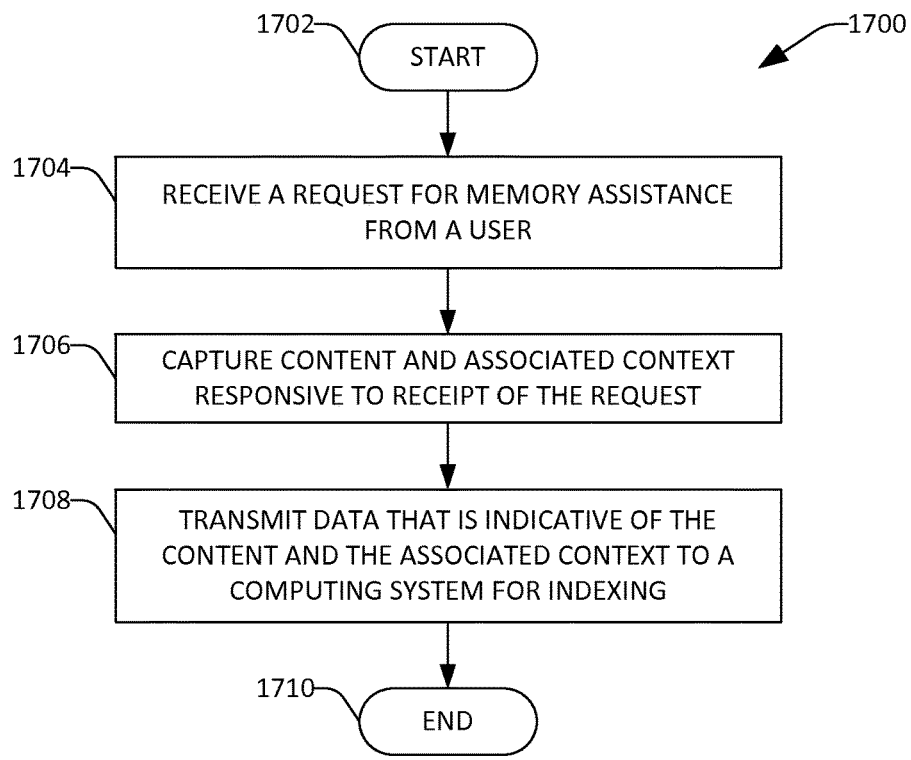
FIG. 17 is a flow diagram that illustrates an exemplary methodology for generating and transmitting contextual data to be used to index captured computer-readable data.

Now referring to FIG. 17, an exemplary methodology 1700 that facilitates transmittal of data to the extended memory system 106 is illustrated. The methodology 1700 starts at 1702, and at 1704, a request for memory assistance is received from the user relative to computer-readable content. As noted previously, the request may be spoken command set forth by the user, a gesture performed by the user, a menu selection performed by the user, and so on. At 1706, content and associated context is captured responsive to receipt of the request. At 1708, data is transmitted that is indicative of the content and the associated context to a computing system for indexing. Specifically, the data that is indicative the content and the associated context is transmitted to the computing system 100, where the extended memory system 106 can index the content by the associated context. The methodology 1700 completes at 1710.

Various examples are now set forth.

Example 1

A method comprising: receiving computer-readable data from a first computer-executable application; receiving contextual data about the computer-readable data from a second computer-executable application, the contextual data generated independently from the computer-readable data; and indexing, in a database, the computer-readable data from the first computer-executable application by the contextual data from the second computer-executable application.

Example 2

The method according to example 1, further comprising: receiving a query, the query references the contextual data; searching the database based upon the query; and outputting data that identifies the computer-readable data responsive to searching the database.

Example 3

The method according to any of examples 1-2, the database customized for a particular user.

Example 4

The method according to any of examples 1-3, the computer-readable data comprises a reference to an entity, the method further comprises: adding metadata to the computer-readable data, the metadata disambiguates the entity; and indexing the computer-readable data by the metadata.

Example 5

The method according to example 4, further comprising responsive to receipt of the computer-readable data, identifying the metadata based upon the contextual data.

Example 6

The method according to any of examples 1-5, further comprising: receiving second contextual data from a client computing device; formulating a query based upon the second contextual data; identifying the computer-readable data in the database based upon the query; and transmitting a recommendation to the client computing device responsive to identifying the computer-readable data, the recommendation based upon the computer-readable data.

Example 7

The method according to any of examples 1-6, wherein the computer-readable data is data presented to a person operating a computing device, and the contextual data is an identity of a second person with whom the person is with when the computer-readable data is received.

Example 8

The method according to any of examples 1-5, further comprising: subsequent to indexing the computer-readable data, receiving second contextual data from a client computing device, the second contextual data matches the contextual data; formulating a query based upon the second contextual data; identifying the computer-readable data based upon the query; and transmitting a reminder to the client computing device or another client computing device responsive to identifying the computer-readable data, the reminder is based upon the computer-readable data.

Example 9

The method according to any of examples 1-8, the computer-readable data received from a first computing device, the contextual data received from a second computing device.

Example 10

The method according to any of examples 1-9, further comprising: subsequent to indexing the computer-readable data, receiving a query and an identity of a person, the query references the contextual data; performing a search based upon the query; identifying the computer-readable data based upon the search; and responsive to identifying the computer-readable data, causing the computer-readable data to be accessible to the person.

Example 11

The method according to example 10, further comprising: subsequent to indexing the computer-readable data, receiving an identity of a third computer-executable application, the person having an account with the third computer-executable application; and causing the computer-readable data to be accessible to the person by way of the third computer-executable application.

Example 12

A computing system comprising: a processor; and a memory that comprises an extended memory system that is executed by the processor, the extended memory system, when executed by the processor, configured to: receive computer-readable data from a first computer-executable application executing on a computing device; receive contextual data that temporally corresponds to the computer-readable data from a second computer-executable application executing on the computing device; and expose the computer-readable data to a search component, the computer-readable data indexed by the contextual data.

Example 13

The computing system according to example 12 being a data center.

Example 14

The computing system according to any of examples 12-13, the computer-readable data comprises a reference to an entity, the extended memory system comprises an entity disambiguator component that is configured to generate metadata to disambiguate the entity, the extended memory system configured to index the computer-readable data by the metadata.

Example 15

The computing system according to example 14, the extended memory system further comprises a context acquirer component that is configured to transmit a signal to a client computing device in response to receiving the computer-readable data, the client computing device configured to generate the contextual data and transmit the contextual data to the computing system responsive to receiving the signal.

Example 16

The computing system according to any of examples 12-15, the extended memory system comprises the search component that is configured to return the computer-readable data based upon a query that references the contextual data.

Example 17

The computing system according to example 16, the search component comprises a query disambiguator component that, when the query includes a reference to an entity, is configured to disambiguate the entity prior to the search component returning the computer-readable data.

Example 18

The computing system according to example 16, the search component is configured to generate the query responsive to receipt of contextual data from a client computing device.

Example 19

The computing system according to example 16, the search component comprises a dialog engine, the dialog engine is configured to output suggestions that facilitate navigation through indexed data.

Example 20

A computer-readable storage medium comprising instructions that, when executed by a processor, cause the processor to perform acts comprising: indexing computer-readable data by temporally corresponding contextual data in a database, the computer-readable data output by a first computer-executable application, the contextual data output by a second computer-executable application; executing a search over the database based upon a query, the query comprises a reference to the contextual data; and outputting a search result based upon the search, the search result comprises the computer-readable data.

Figure 18:
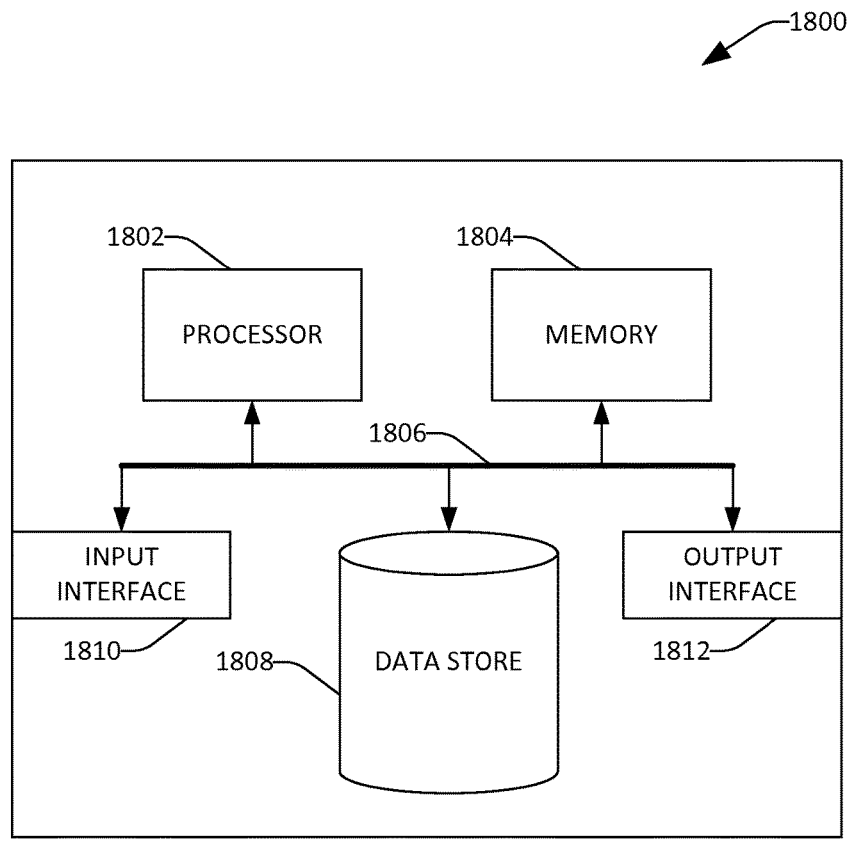
FIG. 18 is an exemplary computing system.

Referring now to FIG. 18, a high-level illustration of an exemplary computing device 1800 that can be used in accordance with the systems and methodologies disclosed herein is illustrated. For instance, the computing device 1800 may be used in a system that supports indexing computer-readable data by corresponding contextual data. By way of another example, the computing device 1800 can be used in a system that supports capturing computer-readable data and corresponding contextual data. The computing device 1800 includes at least one processor 1802 that executes instructions that are stored in a memory 1804. The instructions may be, for instance, instructions for implementing functionality described as being carried out by one or more components discussed above or instructions for implementing one or more of the methods described above. The processor 1802 may access the memory 1804 by way of a system bus 1806. In addition to storing executable instructions, the memory 1804 may also store computer-readable data, contextual data, etc.

The computing device 1800 additionally includes a data store 1808 that is accessible by the processor 1802 by way of the system bus 1806. The data store 1808 may include executable instructions, computer-readable data, contextual data, etc. The computing device 1800 also includes an input interface 1810 that allows external devices to communicate with the computing device 1800. For instance, the input interface 1810 may be used to receive instructions from an external computer device, from a user, etc. The computing device 1800 also includes an output interface 1812 that interfaces the computing device 1800 with one or more external devices. For example, the computing device 1800 may display text, images, etc. by way of the output interface 1812.

It is contemplated that the external devices that communicate with the computing device 1800 via the input interface 1810 and the output interface 1812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1800 may be a distributed system. Thus, for instance, several devices may be in communication by way of a network connection and may collectively perform tasks described as being performed by the computing device 1800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method executed by at least one computing device at a computing system, the method comprising:
   receiving an indication that a user of a client computing device has requested that first computer-readable data generated by a first computer-executable application be stored by the computing system, wherein the first computer-executable application is executing on the client computing device when the indication is received, and further wherein the client computing device has received login credentials of the user;
   responsive to receiving the indication:
      receiving the first computer-readable data; and
      receiving second computer-readable data generated by a second computer-executable application, wherein the second computer-executable application generates the second computer-readable data independently from the first computer-executable application when the first computer-executable application generated the first computer-readable data, wherein the second computer-executable application generates the second computer-readable data immediately responsive to the indication being received such that the first computer-readable data and the second computer-readable data temporally correspond to one another;
   based upon the login credentials, indexing, in a database, the first computer-readable data generated by the first computer-executable application by the second computer-readable data;
   subsequent to indexing the first computer-readable data by the second computer-readable data, receiving a query set forth by the user, wherein the query comprises the second computer-readable data; and
   responsive to receiving the query, returning the first computer-readable data based upon the first computer-readable data being indexed by the second computer-readable data in the database.

2. The method of claim 1, the database customized for the user.

3. The method of claim 1, the first computer-readable data comprises a reference to an entity, the method further comprising:
   adding metadata to the first computer-readable data, the metadata disambiguates the entity; and
   indexing the first computer-readable data by the metadata such that the first computer-readable data is indexed by both the second computer-readable data and the metadata.

4. The method of claim 3, further comprising responsive to receipt of the first computer-readable data, identifying the metadata based upon the second computer-readable data.

5. The method of claim 1, further comprising:
   receiving third computer-readable data from the client computing device;
   formulating a query based upon the third computer-readable data;
   identifying the first computer-readable data in the database based upon the query; and
   transmitting a recommendation to the client computing device responsive to identifying the first computer-readable data, the recommendation based upon the first computer-readable data.

6. The method of claim 1, wherein the first computer-readable data is data presented to the user of the client computing device on a display of the client computing device, and the second computer-readable data comprises an identity of a person with whom the user is with when the second computer-readable data is generated by the second computer-executable application.

7. The method of claim 1, further comprising:
   subsequent to indexing the first computer-readable data by the second computer-readable data, receiving third computer-readable data from the client computing device, the third computer-readable data matches the second computer-readable data;
   formulating a query based upon the third computer-readable data;
   identifying the first computer-readable data based upon the query; and
   transmitting a reminder to the client computing device or another client computing device responsive to identifying the first computer-readable data, the reminder is based upon the first computer-readable data.

8. The method of claim 1, wherein a second computing device executes the second application.

9. The method of claim 1, further comprising:
   subsequent to indexing the first computer-readable data by the second computer-readable data, receiving a query and an identity of a person, the query comprises the second computer-readable data;
   performing a search over the database based upon the query;
   identifying the first computer-readable data based upon the search; and
   responsive to identifying the first computer-readable data, causing the first computer-readable data to be accessible to the person.

10. The method of claim 9, further comprising:
   subsequent to indexing the first computer-readable data by the second computer-readable data, receiving an identity of a third computer-executable application, the person having an account with the third computer-executable application; and causing the first computer-readable data to be accessible to the person by way of the third computer-executable application.

11. A computing system comprising:

a processor; and memory that comprises an extended memory system that is executed by the processor, the extended memory system, when executed by the processor, configured to:

receive an indication that a user of a client computing device has requested that computer-readable data generated by a first computer-executable application executing on the client computing device be stored by the computing system, wherein the computing system has received identifying credentials of the user from the client computing device, and further wherein the client computing device is in network communication with the computing system;

responsive to receiving the indication, receive the computer-readable data generated by the first computer-executable application from the client computing device;

responsive to receiving the indication, receive contextual data that temporally corresponds to the computer-readable data from a second computer-executable application executing on the client computing device, the second computer-executable application generates the contextual data independently from the first computer-executable application generating the computer-readable data, and the first computer-executable application generates the computer-readable data independently from the second computer-executable application generating the contextual data;

based upon the credentials of the user, index the computer-readable data by the contextual data in a database of the computing system;

subsequent to indexing the computer-readable data by the contextual data in the database, receive a query from the client computing device, the query comprises the contextual data;

perform a search over the database based upon the received query; and return the computer-readable data as a search result to the client computing device based upon the computer-readable data being indexed by the contextual data and further based upon the query comprising the contextual data.

12. The computing system of claim 11 being a data center.

13. The computing system of claim 11, the computer-readable data comprises a reference to an entity, the extended memory system is further configured to generate metadata to disambiguate the entity, the extended memory system further indexes the computer-readable data by the metadata such that the computer-readable data is indexed by both the contextual data and the metadata.

14. The computing system of claim 13, the extended memory system, when executed by the processor, is further configured to transmit a signal to the client computing device in response to receiving the computer-readable data, the client computing device configured to generate the contextual data and transmit the contextual data to the computing system responsive to receiving the signal.

15. The computing system of claim 11, wherein when the query includes a reference to an entity, the extended memory system is configured to disambiguate the entity prior to the computer-readable data being returned.

16. The computing system of claim 11, the extended memory system is further configured to generate the query responsive to receipt of second contextual data from the client computing device.

17. The computing system of claim 11, the extended memory system is further configured to output suggestions that facilitate navigation through indexed data in the database.

18. A computer-readable storage medium comprising instructions that, when executed by a processor, cause the processor to perform acts comprising:

receiving, from a client computing device, computer-readable data that an authenticated user of the client computing device has requested to be stored, the computer-readable data presented to the user by a first computer-executable application executing on the client computing device;

responsive to receiving the computer-readable data and for an account corresponding to the authenticated user, indexing the computer-readable data by contextual data in a database, wherein the contextual data corresponds in time to the computer-readable data, the contextual data generated by a second computer-executable application, wherein the computer-readable data is output by the first computer-executable application independent of the second computer-executable application, and further wherein the second computer-readable data is output by the second computer-executable application independent of the first computer-executable application;

subsequent to indexing the computer-readable data by the contextual data, receiving a query that comprises a reference to the contextual data from the client computing device;

executing a search over the database based upon the query; and outputting a search result to the client computing device based upon the search, the search result comprises the computer-readable data.

19. The computer-readable storage medium of claim 18, wherein the client computing device is a mobile telephone.

20. The computer-readable storage medium of claim 18, wherein the contextual data is location data.

* * * * *